W. C. WEBSTER.
ENGINEER'S VALVE AND PRESSURE CONTROLLING MECHANISM FOR AIR BRAKES.
APPLICATION FILED MAY 28, 1914.
1,256,407.
Patented Feb. 12, 1918.
7 SHEETS—SHEET 7.
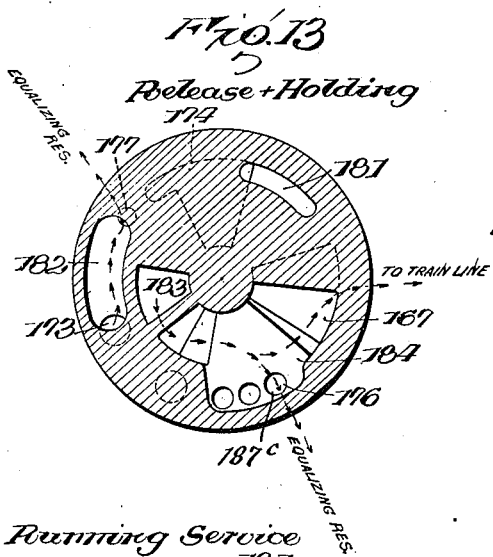
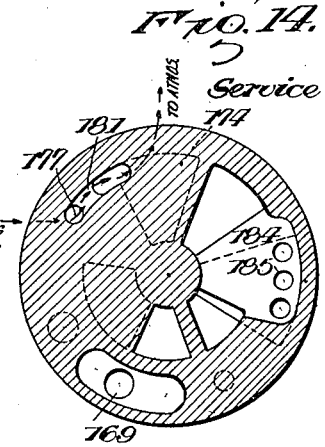
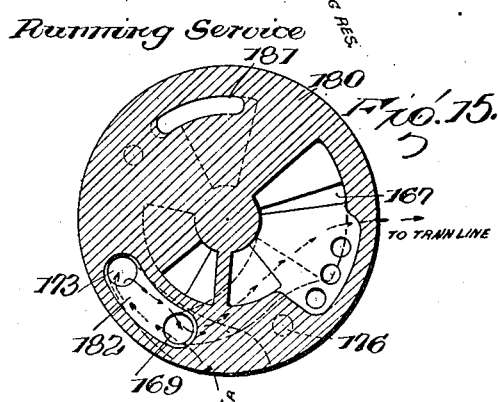
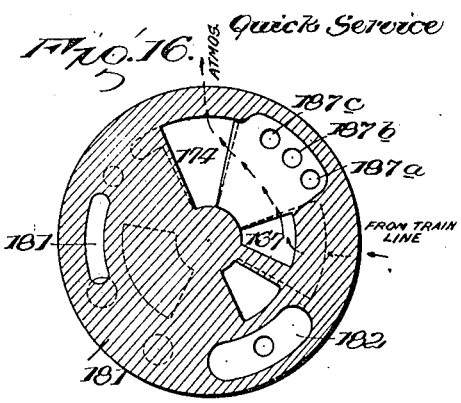
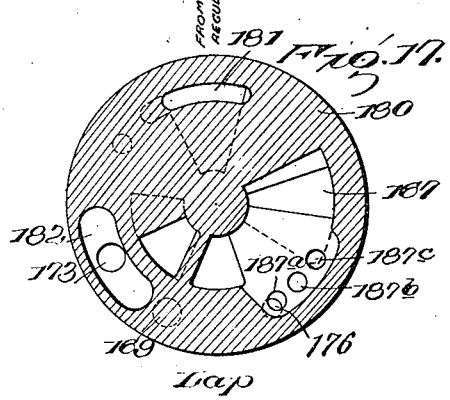
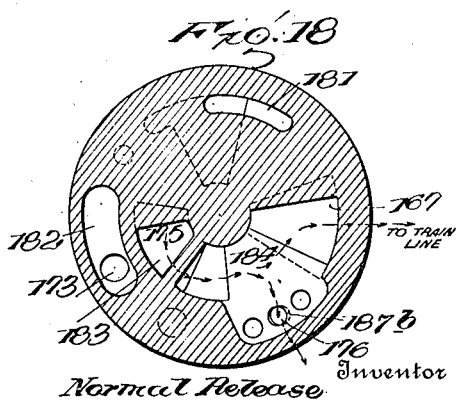
Witnesses
Inventor
W. C. Webster
By
Attorneys.

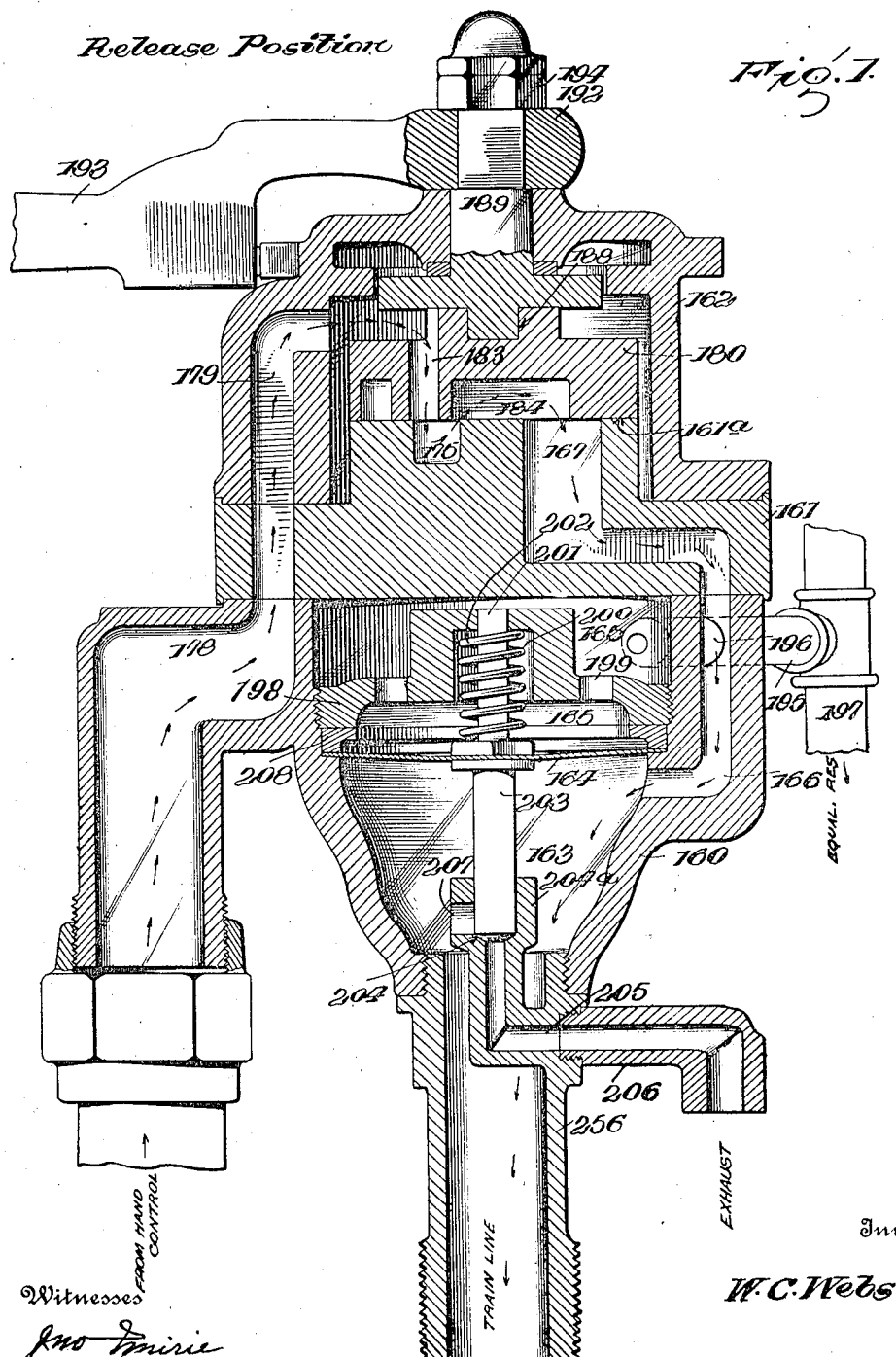

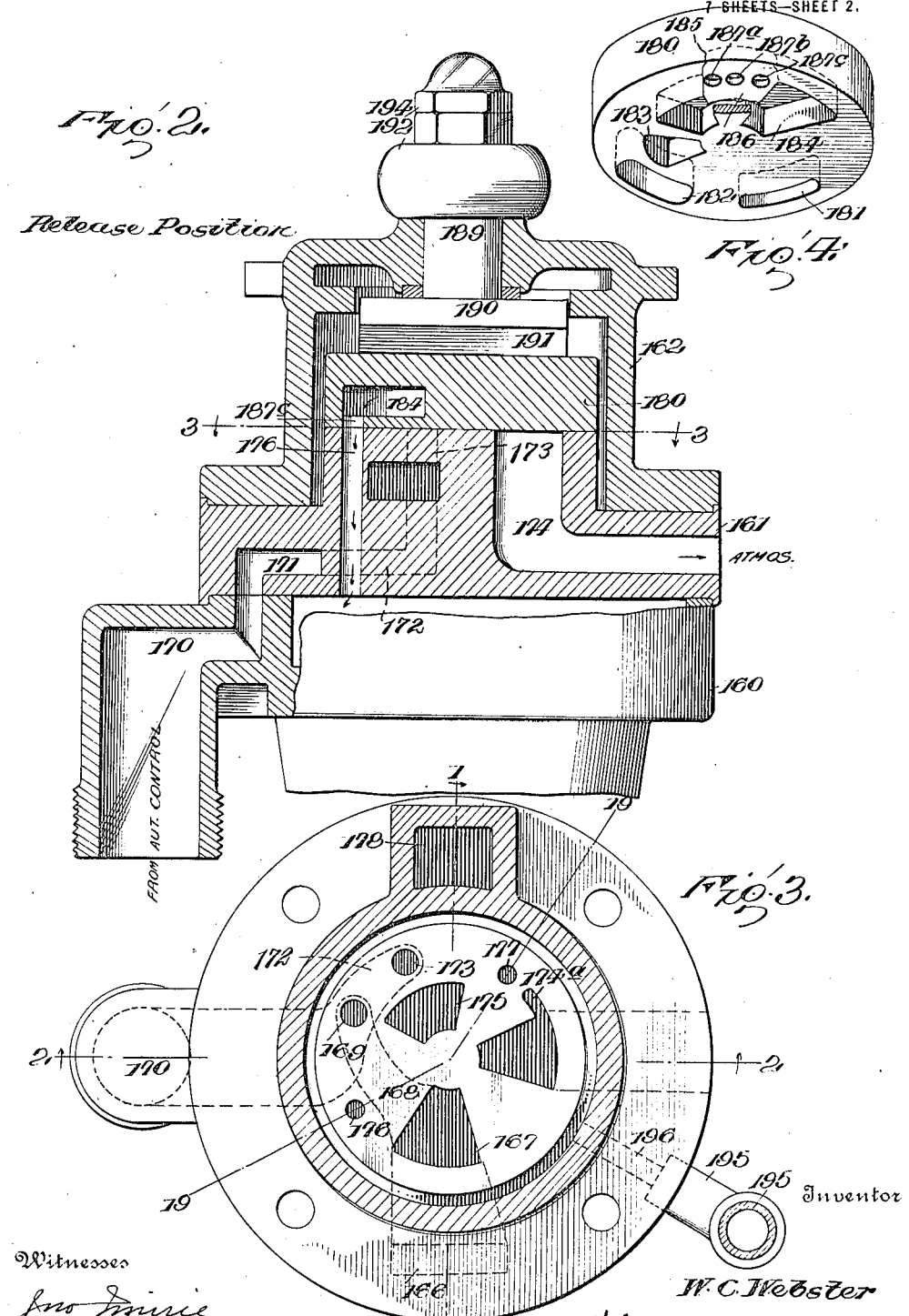

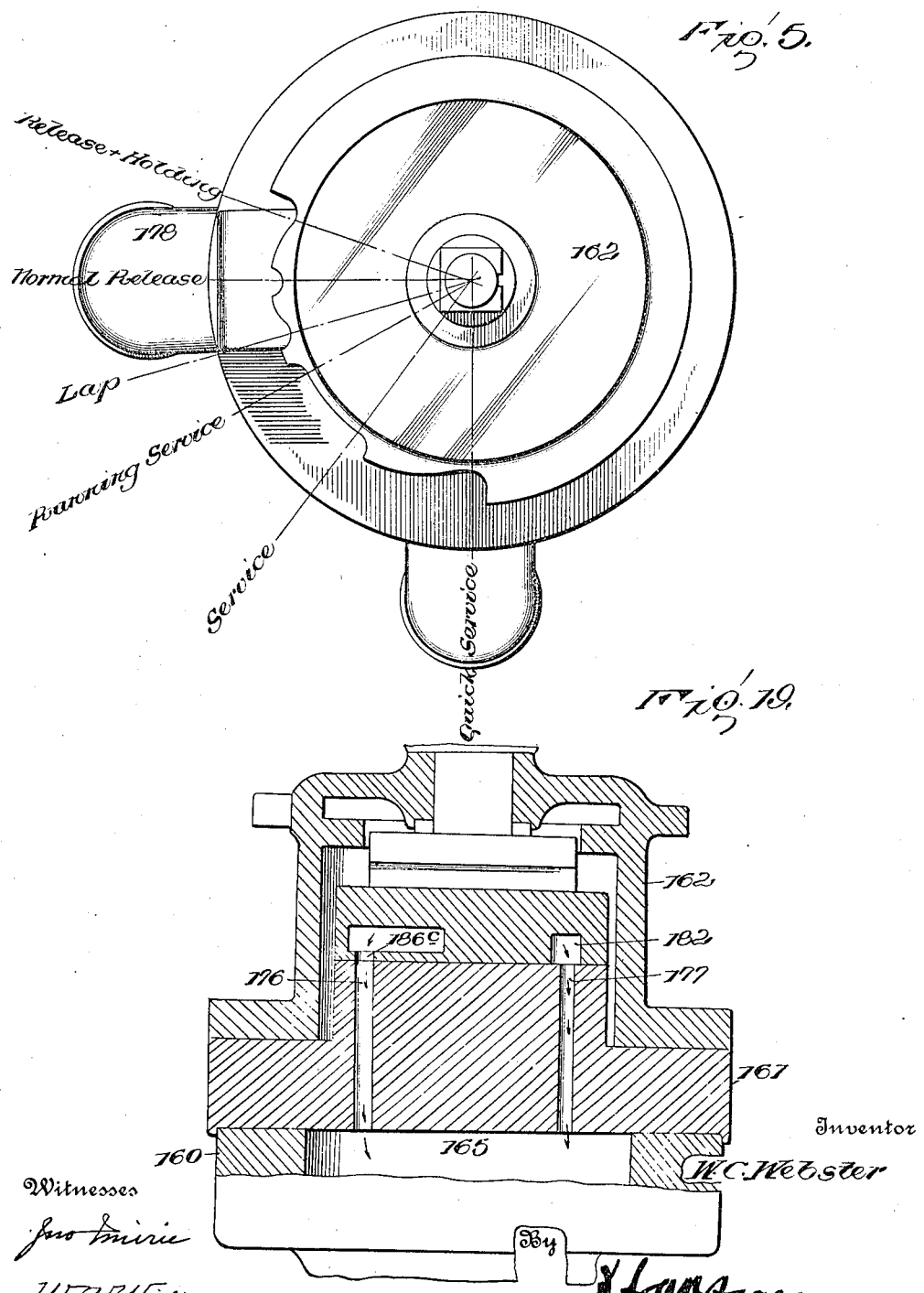

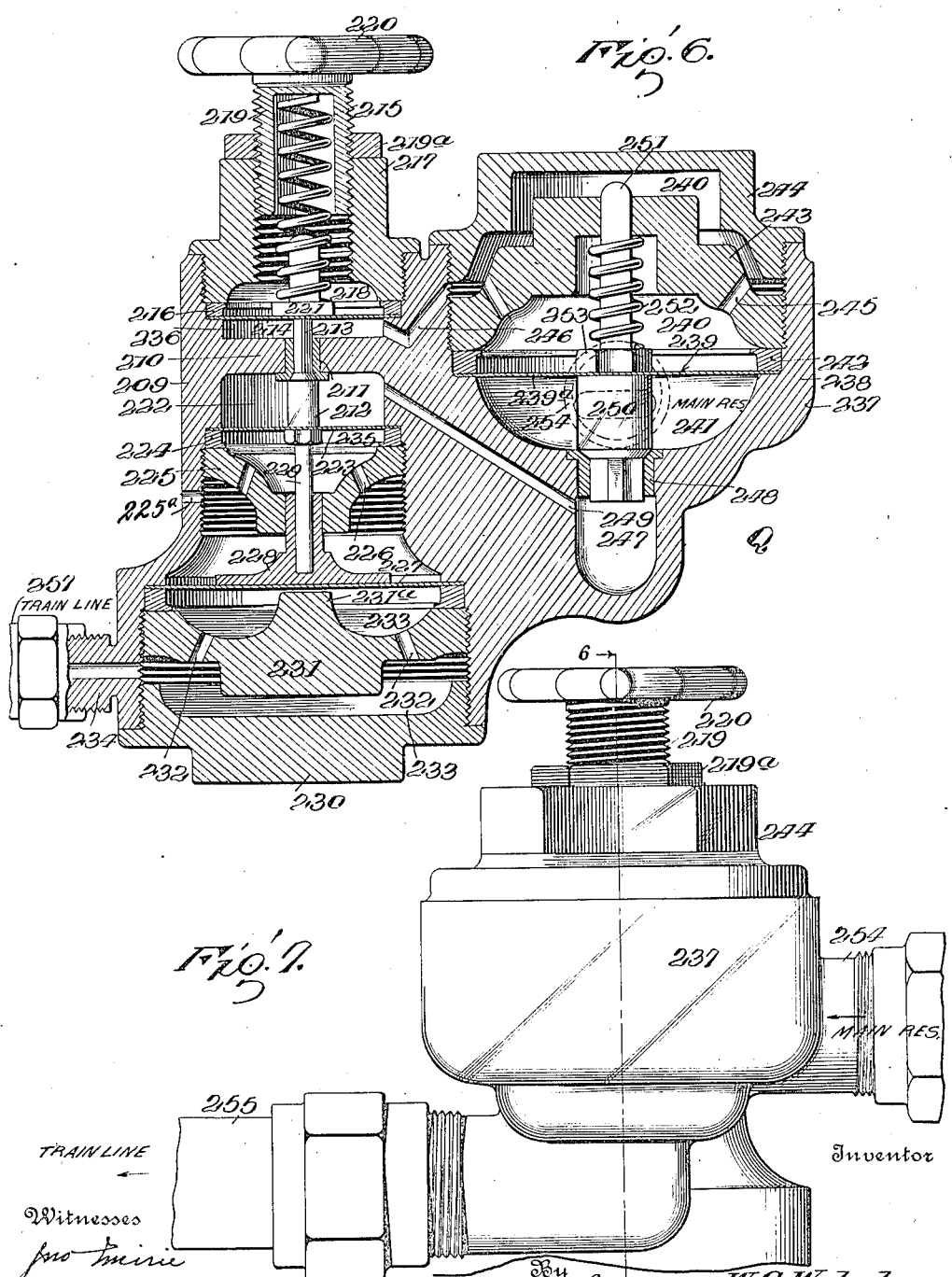

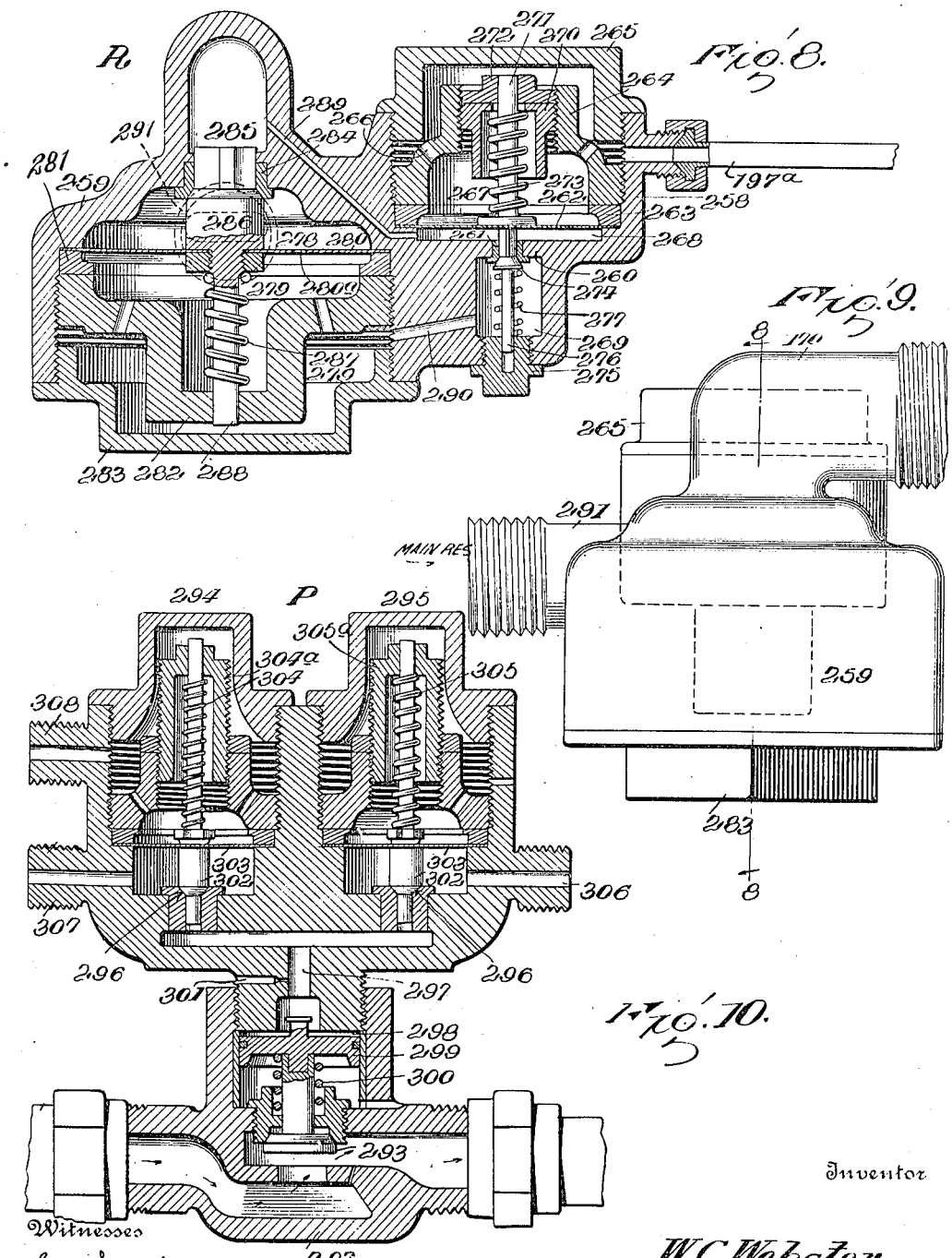

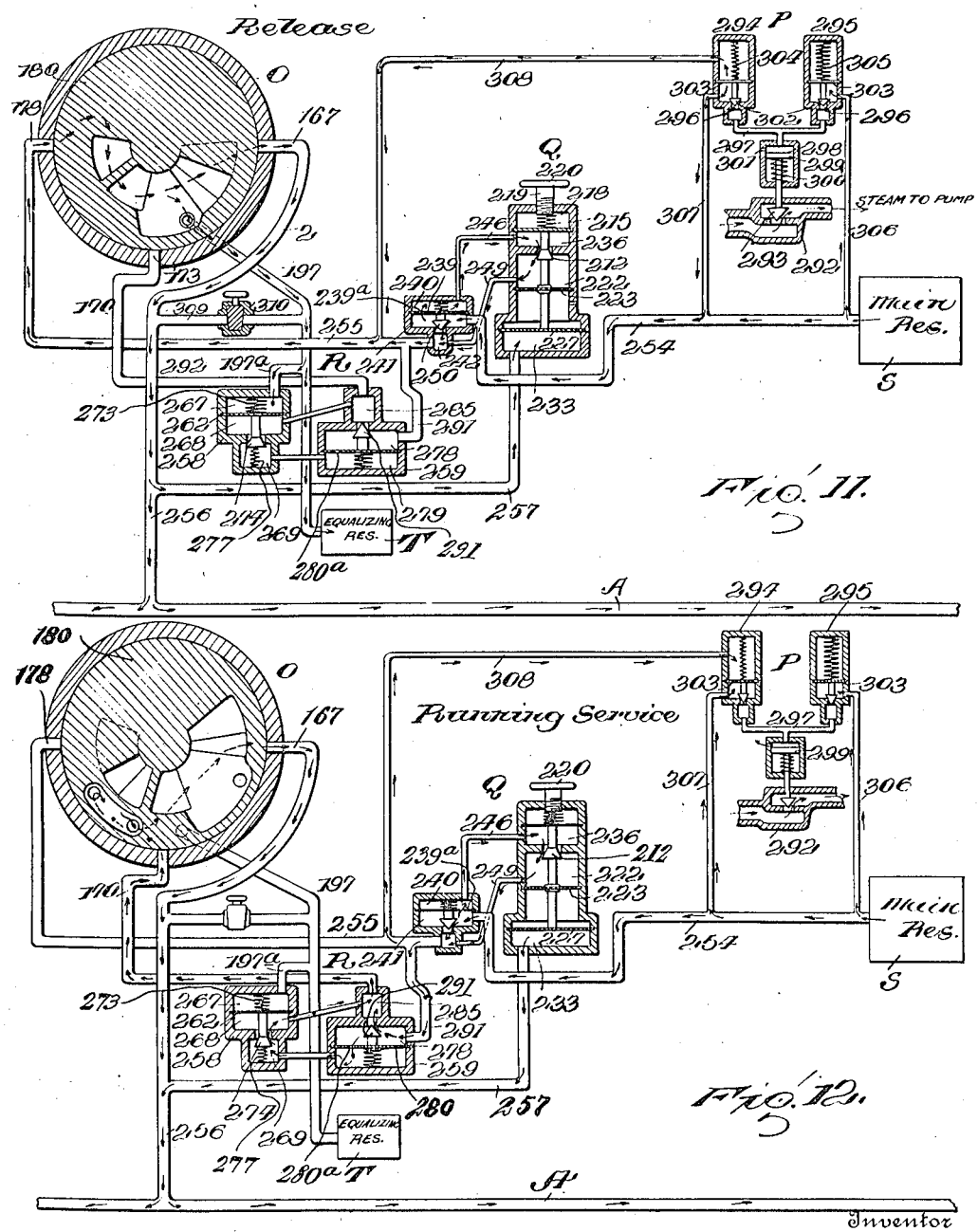

UNITED STATES PATENT OFFICE.

WILLIS C. WEBSTER, OF DUBOIS, PENNSYLVANIA, ASSIGNOR TO BUFFALO AIR-BRAKE COMPANY, OF PHOENIX, ARIZONA, A CORPORATION OF ARIZONA.

ENGINEER'S VALVE AND PRESSURE-CONTROLLING MECHANISM FOR AIR-BRAKES.

1,256,407. Specification of Letters Patent. Patented Feb. 12, 1918.

Application filed May 28, 1914. Serial No. 841,657.

*To all whom it may concern:*

Be it known that I, WILLIS C. WEBSTER, citizen of the United States, residing at Dubois, in the county of Clearfield and State of Pennsylvania, have invented certain new and useful Improvements in Engineers' Valve and Pressure-Controlling Mechanism for Air-Brakes, of which the following is a specification.

My invention relates to air brake systems and particularly to an engineer's brake valve and the means connected therewith whereby pressure in the train line and main reservoir may be controlled.

One object of my invention is to provide means whereby the pressure in the brake pipe may be kept constant after any predetermined reduction therein is made, that is, during service.

Another object is to build up the pressure in the brake pipe to normal or standard pressure when the engineer's valve is in release position. Of these two objects the first is the most important.

It has been heretofore suggested that one of the requirements of proper air brake operation is to provide means for recharging the auxiliary reservoir while the brakes are applied. In practice, however, it has been found that this is not nearly so important as providing means for keeping the brake-pressure constant after any given reduction has been made.

It will be seen that recharging the auxiliary reservoir does not insure braking pressure in the brake cylinders as this pressure may constantly leak away from the brake cylinder and reapplication as above noted will do no good. In order to secure any certainty and uniformity in the braking action, therefore, it is necessary to provide means for keeping the pressure in the brake cylinders constant (which means is shown in my copending application, Serial No. 841,918, filed on the 28th day of May, 1914) and also provide means for keeping the pressure in the train line constant so that this train line pressure may be used to feed those brake cylinders which leak. It is also necessary to provide means to feed the auxiliary reservoirs and keep them at a given pressure and feed the storage chamber and maintain it at the same pressure as the train line.

A further object of my invention is to provide means to feed the brake pipe with the brakes applied and to maintain each triple piston and slide valve in service lap position with pressure standing equal on both sides of the triple piston.

Another object is to so construct the feed valves and the automatic brake valve that friction is entirely eliminated so that air under pressure may be fed accurately to the brake pipe while the brakes are applied and in just sufficient volume to keep the pressure in the brake pipe standing at a definite degree, no more and no less. This is necessary as only a slight rise in the brake pipe pressure will cause a release of the brakes.

One of my objects is to so construct the train line discharge valve in the engineer's brake valve and so construct the automatic brake pipe feed valve that friction shall be eliminated and that they shall respond promptly to control the brake pipe pressure without causing a fluctuation of air sufficient to cause any of the brakes to release.

A further object of my invention is to provide means in the form of feed valves controlling the running pressure in the main reservoir and brake pipe, this means being adjustable so that the running pressure may be raised or lowered as circumstances require. The necessity for increasing the running pressure of the main reservoir and train line arises in cases where the train is descending a grade or in high speed train service and it is necessary to provide means to cut in the excess pressure of the brake cylinder controlling means (described in my copending application upon a triple valve, Serial No. 841,918, filed on the 28th day of May, 1914) or to cut such excess pressure brake cylinder controlling means out.

Still another object of my invention is to provide means whereby when two or more engines are coupled together, the engineer of the head engine may have complete control of the feed valves and pumps of the following engines and also have complete use of their main reservoirs.

Still another object is to provide means whereby in "double heading" a reduction in train line pressure made by the engineer of the first engine will automatically cut out the feed valves of the following engines thus preventing pressure being fed to the train line when a reduction is being made which would nullify the effects of such reduction and whereby a rise of pressure in the train line will automatically act to cut in the feed valves again. With my mechanism this reduction by the engineer of the head engine automatically cuts out the low pressure head of the pump governor and the pumps of all the engines operate to build up the pressure in the main reservoirs equal to the adjustment of the high pressure head, whatever that may be, during the brake application. Upon a release of the brakes at the time when train line pressure has reached its standard or predetermined degree, the low pressure head of each pump is automatically cut in again.

A further object of my invention is to provide the rotary valve of the engineer's automatic brake valve with two release positions, both positions controlling the brake pipe at the same pressure but the brake valve in one position admitting air to the brake pipe slowly and in the other position admitting air to the brake pipe quickly. By having both release positions of the engineer's brake valve controlled at the same pressure but with different volumes, I do away with the possibility of over-charging the brake pipe which is a possibility with the present equipment if the brake valve stays in full release position too long before it is returned to running position. With my construction the engineer's brake valve in one position admits air to the brake pipe quickly so as to operate the automatic retaining valve and cause a retention of the brakes on the head end of the train in long train service (this automatic retaining valve being fully described in my copending application on triple valve, Serial No. 841,918, filed on the 28th day of May, 1914). In the other release position air is admitted to the brake pipe slowly and the normal release is obtained without causing the automatic retaining valve to operate.

Another object in connection with the hand controlled valve whereby pressure in the train line may be determined and controlled, is to provide a train line feed valve that will control the train line pressure without a constant blow and waste of air while the train line pressure is charged to the desired degree. In the ordinary train line feed valve of standard equipment, there is a constant waste of air while the train line pressure remains at the desired point and the blowing off of this air is extremely unpleasant to the engineer.

My invention is illustrated in the accompanying drawings wherein:

Figure 1 is a vertical diametrical section through the engineer's brake valve on the line 1—1 of Fig. 3.

Fig. 2 is a vertical section on the line 2—2 of Fig. 3.

Fig. 3 is a horizontal section on the line 3—3 of Fig. 2.

Fig. 4 is a perspective detail view of the under side of the rotary valve.

Fig. 5 is a top view of the engineer's brake valve.

Fig. 6 is a vertical section of the mechanism for maintaining pressure in the train pipe during release, this section being taken on the line 6—6 of Fig. 7.

Fig. 7 is an elevation of the valve mechanism disclosed in Fig. 6.

Fig. 8 is a vertical section on the line 8—8 of Fig. 9.

Fig. 9 is a side elevation of the mechanism for maintaining pressure in the train line during service.

Fig. 10 is a longitudinal vertical section through a portion of the steam line extending between the steam generator and the air compressing pump and through the pump governor.

Fig. 11 is a diagrammatic view showing the brake valve and correlated mechanism in release position.

Fig. 12 is a like view to Fig. 11 but showing the parts in running service position.

Fig. 13 is a sectional diagrammatic view of the engineer's brake valve at release and holding position, the section being taken on a horizontal plane through the middle of the brake valve.

Fig. 14 is a like view to Fig. 13 but showing the parts in service position.

Fig. 15 is a like view showing the parts diagrammatically in running service position.

Fig. 16 is a like view but showing the parts in quick service position.

Fig. 17 is a like view but showing the valve in lap position.

Fig. 18 is a like view but showing the valve in normal release position.

Fig. 19 is a cross section of the engineer's valve on the line 19—19 of Fig. 3.

Corresponding and like parts are referred to in the following description and indicated in all the views of the accompanying drawings by the same reference characters.

Referring particularly to Figs. 11 and 12, it may be said that, generally speaking, my mechanism comprises an engineer's brake valve designated generally O; mechanism for maintaining pressure during release designated Q; mechanism for maintaining pressure during service designated R; pump governing mechanism designated P; a main reservoir S and an equalizing reservoir T.

All of these parts will be described in detail hereafter and their correlation shown.

The first mechanism to be described in order to secure an understanding of my invention is the engineer's brake valve which is illustrated in Figs. 1 to 5, in the diagrammatic views in Figs. 11 to 18 and in Fig. 19. This comprises a valve body formed of three sections, namely, a base section 160, an intermediate section 161 and a cap section 162. These sections are connected to each other in any suitable manner. The base section is connected to the train line pipe in any suitable manner and is formed with a diaphragm inclosing chamber 163. The chamber 163 is divided into two portions by a diaphragm 164, the space above this diaphragm being designated 165. The chamber 163 below the diaphragm is connected by a passage 166 to a chamber 167 formed in the seat 161$^a$ formed by the upper face of section 161. This chamber 167 is laterally extended as at 168 (see dotted lines in Fig. 3) and then extends upward and opens through the face of the valve seat as at 169.

Formed with the valve body is an elbow 170 which is connected to the automatic controlling mechanism R and from which extends a passage 171 which extends laterally at 172 (see dotted lines in Fig. 3) and opens through the face of the valve seat 161$^a$ as at 173. It will be seen from Fig. 3 that these ports 169 and 173 are disposed relatively adjacent to each other.

Formed in the face of the valve seat 161$^a$ is a cavity or chamber 174 which extends downward and then outward to the atmosphere. This cavity 174 has a lateral extension 174$^a$ at its outer wall. Between the port 173 and the axial center of the valve seat, the seat is formed with a cavity 175. Passing entirely through the valve seat and opening at their lower ends into the chamber 165 are the vertical passages 176 and 177.

Formed with the valve body is the elbow 178 which is operatively connected to the hand controlled pressure maintaining mechanism designated Q. This elbow opens into a vertical passage 179 which opens into the upper end of the valve casing formed by the cap 162.

Resting against the face of the valve seat is a circular disk-shaped rotary valve 180 shown in detail in Fig. 4. This valve is adapted to be rotated by a handle as will be later described. The under face of the valve is formed with a cavity 181 arcuate in form and adapted to register and coact with the equalizing port 177 and with the extension 174$^a$ of the cavity 174, as shown in Fig. 14, or with the port 173 in the quick service position of the valve. At the same distance from the center of the valve is a cavity 182 which is adapted to register with the ports 173 and 177 in the release and holding position of the valve as shown in Fig. 13 or to register with and connect the ports 169 and 173 in running service position as shown in Fig. 15.

Disposed radially inward from the cavity 182, which extends only about half way into the valve 180, is a segmental shaped port 183 which extends entirely through the valve and which coacts with the cavity 175 when the parts are in release position as illustrated in Fig. 1.

Also formed in the under face of the valve and diametrically opposed to the cavities 181 and 182, is a relatively large arcuate cavity 184. This cavity is segmental in general form but is radially extended for a portion of its length at its middle as at 185. The under face of this cavity 184 is crossed by a radially extending web 186 which is provided with three ports 187$^a$, 187$^b$ and 187$^c$. These three ports are adapted in various positions of the valve to register with the port 176 as shown in Figs. 13, 17 and 18.

The valve may be oscillated through a predetermined angular extent by means of any suitable handle. For instance as illustrated the valve is provided in its upper face with a square recess 188, and passing through the cap 162 is a stem 189, the lower end of which is formed with a relatively wide disk 190, the under face of which carries a square stud 191 which engages in the recess 188. The upper end of the stem 189 is reduced and squared for the reception of the eye 192 on a handle 193, the handle being held in place by the usual nuts 194. The upper face of the cap is provided with certain stops with which the handle 193 is adapted to engage as will be more fully described, these stops permitting the handle to be turned through an arc of approximately 90°.

Entering the body 160 through the side wall thereof is a pipe 195 which has a small extension 196 which opens into the chamber 165. This branch 195 is connected to a pipe 197 leading to the equalizing reservoir as shown clearly in the diagrammatic views, Figs. 11 and 12.

Disposed within the chamber 165 is an interior cap or spider 198 which is screw threaded for engagement with the walls of the chamber 165 and is perforated at a plurality of points as at 199. This cap is formed with a recess 200. Extending upward from the diaphragm 164 is a stem 201 which is attached to the diaphragm in any suitable manner and which is surrounded by a spring 202, this spring acting to force the diaphragm downward as illustrated in Fig. 1. The diaphragm carries depending from it in the chamber 163 the valve stem 203. This seats in a valve seat 204 which is disposed in a socket 204$^a$ formed at the intersection of the chamber 163 with the train line pipe.

The valve seat is connected by a duct 205 to a pipe 206 which leads to the atmosphere and which constitutes the exhaust pipe or vent. In the side of the valve socket 204ᵃ is a port 207 which communicates with the chamber 163. It will now be obvious that when the valve 203 is lifted the pressure in the chamber 163 and therefore the pressure in the train pipe will be vented through the pipe 206. The diaphragm 164 is held in place by means of a ring 208 which in turn is held in place by the spider 198 as clearly shown in Fig. 1.

The next mechanism to be described is the mechanism designated Q used for maintaining any desired pressure in the train pipe during release. Referring now to Figs. 6 and 11 it will be seen that this mechanism comprises a body 209 formed intermediate its ends with a septum 210 having a central perforation provided with a bushing 211 which constitutes a valve seat. Coacting with this valve seat is a valve 212 which when it is raised closes against the valve seat and which when depressed permits the passage of air through the valve seat. Extending upward from this valve is a stem 213 which bears against a diaphragm 214 against which operatively bears a spring 215. Preferably the diaphragm 214 is held in place by a ring 216 and this in turn is held in place by an annular cap 217 which is exteriorly screw threaded to engage the wall of the chamber 218 formed above the diaphragm 214. This cap is interiorly screw threaded for engagement by a hollow plug 219 which carries a hand wheel 220. The spring 215 extends at its upper end into this hollow plug and bears against the upper wall thereof and at its lower end the spring bears against a head 221 which rests upon the diaphragm 214. The spring 215, therefore, resists any upward movement of the diaphragm and it will be obvious that the tension of this spring may be adjusted by rotating the hand wheel 220 in one direction or the other to thus depress or elevate the plug 219. This plug is held in adjusted position by a jam nut 219ᵃ.

The space immediately below the septum 210 is designated 222 and this space is closed at its lower end by means of the diaphragm 223 which is connected to the valve 212. This diaphragm 223 is held in place by a ring 224 in turn held in place by an annulus 225 having ports 226 leading into the space below the annulus. Below this annulus and disposed in the enlarged lower portion of the valve body 209 is a diaphragm 227 which is approximately twice the size of the diaphragms 223 and 214, and resting upon this diaphragm 227 is a head 228 having a stem which extends up through the central portion of the annulus 225, this stem being hollow and receiving a stem 229 depending from the valve 212. Thus the three diaphragms 227, 223 and 214 are connected to move together.

The lower end of the body 209 is closed by a cap 230 and disposed inward of this cap and engaging the wall of the enlarged portion of the lower end of the body 209 is an interior cap 231 formed with ports 232. The central portion of the cap 231 is extended upward as at 231ᵃ so as to be disposed a slight distance below the diaphragm 227 and prevent too great downward bulging of this diaphragm under pressure.

It will be seen that below the diaphragm 227 there is a space 233 and that this space 233 communicates with the space between the cap 230 and the interior cap 231. This space below the cap 231 is also numbered 233 inasmuch as the spaces above the cap and below the cap constitute one chamber. The wall of the body 209 has a nipple 234 whereby connection may be made between the train line and the space 233. The space below the diaphragm 223 is designated 235. The space below the diaphragm 214 is designated 236.

Preferably formed integral with the body 209 is a valve chamber 237 illustrated in detail in Fig. 6 and diagrammatically in Fig. 11. The wall of this valve chamber is designated 238. Crossing the valve chamber and dividing it into two parts is a diaphragm 239. The space above the diaphragm 239 is designated 240 and the space below 241. The diaphragm is held in place by a ring 242 and an interior cap or spider 243, and the upper end of the valve chamber is closed by a cap 244. The spider or annulus 243 is perforated as at 245 and thus the chamber 240 communicates with the space between the annulus 243 and the cap 244. This last named space therefore forms part, to all intents and purposes, of the chamber 240 and is, therefore, designated 240.

Opening into the space between the cap 244 and the annulus 243 through the side wall of the chamber 237 is a duct 246 which connects the chamber 240 with the space immediately below the diaphragm 214 and above the valve seat 211. The space 241 is downwardly enlarged, as at 247, and provided with a bushing 248 forming a valve seat. This space 247 is connected to the space 222 between the diaphragm 223 and the valve seat 211 by means of a duct 249.

Mounted upon the diaphragm 239 is a valve 250 which seats against the valve seat 248 and projecting upward from this valve and attached to the diaphragm and valve is a stem 251 which passes through a central perforation in the spider 243 and which is surrounded by a spring 252, this spring bearing upon a nut 253 engaging the diaphragm 239 with the stem 251 and with the valve. The spring 252, therefore, acts to force the valve to its seat. When, however, the pressure is reduced on the upper side of the diaphragm 239, it will be obvious that the valve 250 will be lifted from its seat against the force of the spring 252.

Entering the chamber 241 below the diaphragm 239 is the pipe 254 which leads from the main reservoir, as shown in Figs. 11 and 12. Extending from the chamber 247 below the valve seat 248 is a pipe 255 which connects to the elbow 178 on the brake valve.

The pipe leading from the engineer's valve to the train line pipe A is designated 256. The connection of this pipe to the brake valve has been heretofore described. This pipe connects at one end to the brake valve and at the other end to the train line A. The space 233 below the lower end of the diaphragm 227 is connected to the pipe 256 by a pipe 257. It will now be obvious that there will be main reservoir pressure in the space 241 below the diaphragm 239 and that there will be train line pressure in the space 233 below the diaphragm 227.

Before stating the operation of the mechanism, I will describe the construction of the mechanism R for maintaining pressure in the train line during the service application of the brakes. The mechanism for this purpose comprises two conjoined valve chambers, one designated 258 and the other 259. The valve chamber 258 is divided into two parts by the septum 260 which is formed at its center with a valve seat 261. Above the valve seat is disposed a diaphragm 262 held in place by a ring 263, in turn held in place by a spider 264. The upper end of the valve chamber 258 is closed by a cap 265. The spider 264 is perforated as at 266. The space above the diaphragm may be designated 267 while the space below the diaphragm may be designated 268, and the space below the septum 260 may be designated 269.

Disposed in the upper portion of the spider 264 is an annular member 270 which is exteriorly screw threaded to have adjustable engagement with the spider, and passing through this annular member is a stem 271 which has sliding engagement through a jam nut 272, this nut having screw threaded engagement with the interior upstanding wall of the spider. The stem 271 bears against the diaphragm 262, and surrounding this stem is a coil spring 273 which urges the diaphragm downward.

Mounted upon and depending from the diaphragm 262 is a valve 274 which closes upward against the valve seat 261. The lower end of the chamber 269 is closed by a plug 275 recessed for the reception of a stem 276 which depends from the valve 274 and which is surrounded by a spring 277. It will be obvious that when the pressure in the space 268 is less than a certain amount, the air pressure in the space 267 and the spring 273 will force the diaphragm downward and unseat the valve 274 and when there is sufficient pressure in the chamber 268, the valve will be closed. The space 267 above the diaphragm 262 is connected by a pipe 197ª to the pipe 197 which leads to the equalizing reservoir T. The spring 273 is stronger than the spring 277 to offset the pressure against the lower face of the valve 274 as this valve face, when the valve is closed and the brake valve is in running service position, is subjected to substantially main reservoir pressure.

The valve casing 259 is divided into two chambers 278 and 279 by a diaphragm 280 having a perforation 280ª. The upper chamber 278 is enlarged to form a chamber 285 which is connected to pipe 170. Disposed between the chambers 278 and 285 is a valve seat 284, with which a valve 286 co-acts, this valve being mounted upon the diaphragm 280 and having a stem 288 which passes downward through the diaphragm. The lower portion of the valve chamber 259 is enlarged and disposed therein is an interior cap or spider 282 which engages a ring 281 which holds the diaphragm in place, this cap being provided with perforations. Closing the lower end of the valve chamber 259 is a cap 283, a stem 288 of the valve passes through the perforation in the interior cap or spider 282 and the valve 286 is held to its seat by a spring 287. The chamber 269 is connected to the chamber 279 by means of a passage 290 while the chamber 285 is connected to the space 268 below the diaphragm 262 by a passage 289. The pipe 291 extends from the space 278 to the pipe 255.

The pump and governing mechanism is practically the same as that found in all standard equipments. The pump is not shown, but the steam pipe leading to the pump is designated 292, and passage of steam from the steam generator to the pump is controlled by means of the valve 293. The pump governing mechanism P comprises the low pressure head 294, and the high pressure head 295. Each of these pressure heads or chambers has a valve seat 296 at its lower end leading into a relatively small chamber connected by a port 297 to a chamber 298 within which is disposed a piston 299 connected by a stem to the valve 293. A spring 300 acts to force this piston upward. The upper end of the chamber 298 is provided with an atmospheric vent 301. Disposed in each of the chambers or pressure heads 294 and 295 is a valve 302 closing against the corresponding valve seat. Each valve is connected to a diaphragm 303 supported in any suitable or usual manner. Disposed above the diaphragm 303 in the chamber or low pressure head 294 is a spring 304 which bears downward against the diaphragm 303 and holds the corresponding valve 302 to its seat. This spring has a tension equal to twenty pounds or more. Disposed in the high pressure head or chamber 295 is a spring 305 which exerts a pressure of one-hundred and ten pounds against the diaphragm 303, so as to hold the valve connected thereto closed. From the high pressure head 295 extends a pipe 306 which connects to the pipe 254 and thus connects to the main reservoir, while from the chamber 294 or low pressure head below the diaphragm 303 extends a pipe 307 which connects to the pipe 254. From the upper portion of the chamber 294 above the diaphragm 303 extends a pipe 308 which connects to the pipe 255. Thus the underside of the diaphragm in the chamber 294 is at all times filled with air at main reservoir pressure, while the pipe 308 is, in release position, filled with air at train line pressure.

The low pressure head 294, as will be hereafter seen, operates to control the pump in release or release and holding position, while the high pressure head operates during service position. The low pressure head is controlled by the pressure of the train line, while the high pressure head is controlled by the pressure of the main reservoir. It will be obvious that, when the pressure below the diaphragm in the chamber 295 increases beyond the force exerted by the spring 305, the diaphragm will be forced upward and air will be admitted through the chamber 295 to the upper end of the chamber 298, causing the closing of the valve 293 and the cutting off of steam to the pump. When the pressure in the main reservoir is less than one-hundred and ten pounds, however, the spring 305 will cause the valve to close, and as the valve in the chamber 294 is also closed, the combined pressure of the spring 304 and air in the chamber above the diaphragm 303 being greater than the pressure below the diaphragm, the spring 300 will cause the valve 293 to open, allowing the passage of steam to the pump until such time as the pressure again increases in the main reservoir to a point above one-hundred and ten pounds.

It will also be obvious that the space beneath the diaphragm of the chamber 294, inasmuch as it is connected to the pipe 254, will have in it pressure equal to the pressure in this pipe. With a main reservoir pressure of one-hundred and ten pounds, the pressure in the pipe 254 will be 110 pounds, and therefore the pressure on the underside of the diaphragm in the chamber 294 will be 110 pounds. The normal train line pressure is seventy pounds, and under all circumstances, no matter how high the pressure in the pipe 254 is raised, there will always be in release position twenty pounds difference between the train line pressure and the pressure in the pipe 254. The spring 304, exerting a force equal to twenty pounds, it is obvious that, if the pressure in the pipe 308 is seventy pounds and the pressure in the pipe 307 is ninety pounds, the pressure below the diaphragm will equal the pressure of air and the pressure of the spring above the diaphragm and the valve of the chamber 294 will be held closed. If, however, the pressure in the pipe 307 increases beyond ninety pounds, then the diaphragm will be raised, raising with it the valve, and air will be admitted to the chamber 298, causing the valve 293 to close.

Inasmuch as this pump governor is of the ordinary duplex type which is well known in the art, it is not believed that any detailed view of the pump governor will be required other than Fig. 10.

The operation of my invention is as follows:—

While the train is standing still, pressure in the chamber 233 holds the valve 212 closed. When pressure in the train line falls, due to any cause, pressure also falls in the chamber 233 and the valve 212 opens. This allows air from the space 240 to escape into the space 222 above the diaphragm 223, and thence to escape by the duct 249 to the chamber 247, and thus to the pipe 255, and thence to the train line through the "rotary" or engineer's brake valve by the course shown by arrows in Fig. 11. As the air passes quickly from the chamber 240 there will be greater pressure on the underside of the diaphragm 239 than on the upper side. As a consequence, the valve 250 will open and main reservoir air passes to the pipe 255, which, as before stated, is connected to the train line through the engineer's valve. The pipe 257 has in it train line pressure, and when the pressure of the train line builds up and the pressure in the chamber 233 builds up sufficiently to overcome the spring 215, which, we will say, is set at seventy pounds pressure but which may be set at any desired pressure, the diaphragm 227 will be raised and the valve 212 will close. This will prevent the escape of air through the duct 246 and, as a consequence, air will pass through the perforation 239ª in the diaphragm 239 and build up behind the diaphragm 239 until the pressures on opposite sides of the diaphragm 239 are equal, whereupon the valve 250 will close, cutting off pressure from the main reservoir. In the release and holding position (which is the position shown in Fig. 11) exactly the same operation occurs.

Thus it will be seen that as soon as the train line pressure drops below seventy pounds (if the controlling valve spring 215 is set for this pressure) the train line is fed, and as soon as the pressure in the train line rises to seventy pounds pressure or to any pre-determined pressure, the feed of air from the main reservoir is cut off. During this time the pressure is constantly kept at seventy pounds in the equalizing chamber T and in the chamber 267, above the diaphragm 262. Now, when a service reduction is made (assuming that the normal pressure in the train pipe is seventy pounds) the pressure in the chamber 267 is vented together with air in the equalizing chamber according to the reduction desired. This air is vented through the passage 174 to the atmosphere and the amount of air so vented or reduction of pressure so made in the equalizing chamber and in the chamber 267 is indicated by the gage connected to the upper end of the pipe 197 but which is not shown. The venting of the pipe 197 is accomplished by venting the air in the chamber 165, and thus pressure in the chamber 165 is reduced so as to reduce the pressure on the upper side of the diaphragm 164. This will cause lifting of the valve 203 and the air in the train pipe is vented. The reduction in pressure in the chamber 267 immediately causes the valve 274 to close, this valve having heretofore been held open by the spring 273 and air pressure. This prevents escape of air from below the diaphragm 280 and, as a consequence, the air which passes through the pipe 291 to the upper side of the diaphragm 280 will cause the valve 286 to close, preventing the passage of main reservoir pressure to the train pipe by way of the pipe 170, the ports 173 and 169 and the cavity 182.

The reduction of the train line pressure immediately reduces the pressure in the controlling chamber 233 to a point below seventy pounds, and this causes the spring 215 to open the valve 212. This releases air above the diaphragm 239 and the main reservoir pressure opens the valve 250, permitting the main reservoir pressure to flow to the pipe 255. This pipe is, however, blanked, as shown in Fig. 12.

After reduction is made in the equalizing chamber T and the chamber 267, the brake valve 180 is shifted to running service position which laps the ports 176 and 177, as shown in Fig. 12, holding the air in the equalizing chamber and the chamber 267 at sixty-five pounds (assuming that a five pound reduction has been made from a train pipe pressure of seventy pounds). If now the pressure in the train line rises above sixty-five pounds, the pressure on the underside of the diaphragm 262 will cause the valve 274 to close. This will prevent the escape of air from below the diaphragm 280, the main reservoir pressure will pass through the opening 280ª in the diaphragm 280 and will raise the pressure below the diaphragm 280 until the valve 286 is closed. As soon as this is closed, passage of air to the train line will be cut off.

If now, on the other hand, the pressure in the train line drops below sixty-five pounds through leakage in the train pipe, then the pressure in the chamber 268 will be less than sixty-five pounds and air pressure and the spring 273 will cause the valve 274 to open. This allows air below the diaphragm 280 to escape relieving the pressure below the diaphragm, and the excess pressure above the diaphragm will cause the valve 286 to open, permitting passage of air to the train line pipe until its pressure is built up to sixty-five pounds, whereupon the valve 286 will again be closed.

The operation of the pump governor in connection with the parts which have heretofore been described is as follows:

In Fig. 11 the parts are shown in the position which they occupy when pressure is being built up to release the brakes. Air is, therefore, flowing from the main reservoir and from the pipe 255. Inasmuch as the main reservoir pressure is reduced below one hundred and ten pounds the valve in the high pressure head 295 is entirely closed. Under these conditions, the pipes 307 and 308 will both be in communication with the main reservoir and the air pressures against opposite sides of the diaphragm of the low pressure head will be equal. The spring of the low pressure head will, therefore, maintain its valve closed and the spring of the pump governor will hold its valve in open position. Steam will, therefore, pass to the pump and cause it to operate to compensate for the loss of pressure in the main reservoir and this action of the pump will be continued until such pressure becomes high enough to open the valve of the high pressure head and permit passage of air from the main reservoir to the pump governor to close the valve of the latter.

When the pressure in the train pipe and in the chamber 233 rises to seventy pounds (assuming that this is the pressure which is being kept in the train pipe) it closes the valve 212 which causes closing of the valve 250 and closes communication between the pipe 254 and the pipe 255. With the valve 250 closed, the pressure in the pipe 308 immediately equalizes with the train line pressure at seventy pounds. There is, therefore, seventy pounds pressure in the chamber 294. Upon a stoppage of flow from the pipe 254, it is plain that there will be a greater pressure in the pipe 307 than in the pipe 308, and thus greater pressure in the lower end of the chamber 294 than in the upper end thereof. This will cause the valve in the chamber 294 to open, stopping the pump. The pump will remain at rest until the pressure in the main reservoir and the pipes 254 and 307 (by leakage in train pipe) is reduced slightly below ninety pounds, whereupon the spring and air pressure above the diaphragm will cause the valve in the chamber 294 to again close, and the pump will once more operate, just so long as the brakes are released, and pressure will be carried in the main reservoir equal to that in the chamber 294 plus the spring, thus allowing the pump to work against a low pressure during the time that the brakes are released. Inasmuch as the brakes are released for the greater portion of the time, it is obvious that the pump should work only against a low pressure at such a time, as otherwise the pump would overheat.

The pump must work in running service position to build up a high pressure in the main reservoir so as to have sufficient air to secure release and recharging. In running service position the upper and lower ends of the chamber 294 both contain air at main reservoir pressure, and hence, the spring causes the closing of the valve in the chamber 294, cutting out the low pressure head. As the main reservoir pressure is low at this time, namely ninety pounds, the pump will immediately commence to operate until the pressure in the main reservoir equals the pressure of the spring in the high pressure head. If this spring is set at one hundred and ten pounds, then the pressure in the main reservoir will be built up to one hundred and ten pounds and the pump governor will hold the pressure in the main reservoir at one hundred and ten pounds during the time the brakes are set. As soon as release is effected, the pressure in the main reservoir will again drop to ninety pounds, as previously stated.

Attention is called to the fact that by the construction illustrated in Fig. 10, the springs 304 and 305 are adjustable. To this end, the stem of each valve passes through a screw-threaded cap, the cap for the spring 304 being designated 304ª and the cap for the spring 305 being designated 305ª. These caps have screw-threaded engagement with the spiders which hold the diaphragms in place so that by adjusting the caps the tension of one or both of the springs may be increased or decreased. The spring 304, as previously stated, is always kept at such tension to exert a pressure of twenty pounds upon its diaphragm, but the tension of the spring 305 is adjusted to suit the amount of pressure it is desired to maintain in the main reservoir during breaking application, whatever that may be.

As will be seen by reference to Fig. 5 and Figs. 13 to 18, there are six positions of the valve 180. Fig. 18 shows the valve 180 at normal release position. This position of the valve causes a slow rise of pressure in the train line and a quick release of the brakes as the automatic retaining mechanism (described and illustrated in my application on a triple valve, previously referred to) is not caused to operate. This normal release is used in short trains. In this position air from the pipe 255 is passed through the pipe 178 into the upper part of the cap 162 and down through the port 183 into the cavity 175, thence into the cavity 184, and thence through a relatively small port opening into the cavity 167 and so into the train line. Air is also passing from the cavity 175 through the ports 187ᵇ and 176 into the chamber 267 and into the equalizing reservoir T. It will be seen by reference to Fig. 18 that the port 173 opens into the cavity 182, but that this cavity does not connect with any other port, and that, therefore, passage of air from the pipe 170 is cut-off.

The release and holding position of the valve, which is shown in Fig. 13, is the same as the normal release position, except that with the valve in release and holding position a quick rise of pressure is caused in the train pipe instead of a slow rise of pressure, and hence the automatic retaining mechanism above referred to, is operated and holds the brakes on the head end of the train. The cavity 182 very slightly laps the port 177 leading into the equalizing reservoir, and partially laps the port 173 leading from the controlling or feed valves R. Thus the chamber 165 is rapidly charged with air from the hand feed control valve Q through the ports 176 and 187ᶜ, and from the automatic feed valve through the ports 173 and 177, to correspond with the quick rise of pressure in the chamber 163, and to prevent the rise of the diaphragm 164.

In service position communication is established between the equalizing reservoir and chamber 267 and the atmosphere by means of the cavity 181, which vents a certain amount of air from the equalizing reservoir and chamber 267 to the atmosphere by way of the chamber 174.

After service reduction has been made by moving the valve to the service position shown in Fig. 14, the valve is then moved to the running service position. This cuts off the passage of air from the equalizing reservoir and chamber 267 by way of the pipe 197, and traps the air in the equalizing reservoir and in the chamber 267. This position of the valve opens communication between the automatic control valve casing 259 and the train line, through the cavity 182 which laps the ports 173 and 169, as shown in Fig. 15.

If, for any reason, the controlling valve mechanism contained in the chamber 258 does not work, and, therefore, the train line pressure would build up, then after the valve is shifted to the service position it is brought back over the running service position to lap position. This cuts off communication from the main reservoir of the train line, as will be clearly observed from Fig. 17, and the brakes operate in the usual manner. This is also done if the train breaks in two, otherwise the main reservoir pressure would be immediately vented at the break in the train pipe.

Where quick service is desired, the valve is turned to the position shown in Fig. 16, so as to establish a relatively large area of communication between the train line and the atmosphere through the passage 174 instead of opening a relatively small passage through the vent 206 which is accomplished in ordinary or normal service.

It will be particularly noted that the feed valve mechanism, designated Q, operates to regulate the pressure in the train pipe at release and holding position to maintain normal pressure in the train pipe, while the valves are in release position, and that the pressure feeding mechanism, designated R, is for the purpose of maintaining a constant pressure in the train pipe for a given reduction in the equalizing reservoir.

In double heading with the present equipment, it is necessary that the main reservoir and pump mechanism on the following engine or engines be cut out so that the control may be entirely in the hands of the engineer of the head engine. One of the objects of my invention is, as previously stated, to provide means whereby the use of the pumps and the main reservoir of the second or third engines may be secured, and the operation of these instrumentalities be under the control of the engineer on the head engine, and to provide means whereby a reduction in the train line pressure made by the engineer of the first engine will automatically cut out the feed valves of the following engine or engines, thus preventing pressure being fed to the train line through the brake valves and allied parts of the following engines which would nullify the effects of such reduction and whereby a rise of pressure in the train line will automatically act to cut in the feed valves again, so that advantage may be taken of the main reservoir of each following engine and of the pump mechanism thereof. The mechanism whereby this is attained is as follows:

It will be seen from Figs. 11 and 12 that the pipe 197 is connected with the pipe 256 by a pipe 309, within which is disposed a valve 310 or cock so formed that, when turned in one direction, communication will be established through the passage or pipe 309, and that, when turned in the other direction, this communication will be cut off. It will be obvious from Figs. 11 and 12 that, when the valve is turned to the position therein shown, any air which passes to the chamber 267 and to the equalizing reservoir T must pass through the engineer's valve.

In double heading, however, the valves 310 on the following engines are turned to open the passages through the pipes 309. As a consequence this chamber 267 on the engine succeeding the head engine will be connected direct to the train pipe. It will be seen now that a reduction of pressure in the train pipe will cause a reduction of the pressure in the chamber 267. The engineer's brake valves of the second and third engines are turned to running service position. This, as before explained, will prevent passage of air from behind the diaphragm 280 and pressure will build up behind this diaphragm through the perforation 280ª as a consequence. At the same time, pressure in the chamber 233 is reduced below the adjustment of the spring 215, and the spring causes the valve 212 to open, which reduces the pressure in the chamber 240 below the main reservoir pressure. This causes the valve 250 to open and remain open so long as pressure in the chamber 233 is reduced below the adjustment of the spring 215. This causes the entire valve mechanism Q to be cut out, or, in other words, permits the air to pass freely through it. This allows the main reservoir air to pass through the pipe 307 into the upper end of the low pressure head 294. This automatically cuts out the low pressure head 294 of the governor and the pumps of the engines must, therefore, operate to build up pressure in the corresponding main reservoirs equal to the adjustment of the high pressure heads during brake application. Upon a release of the brakes, however, the pressure in the train line will rise, and this will be transmitted through the cut-out cock 310 to the diaphragms 262 and 227, causing a depression of the diaphragm 262 and an opening of the valve connected thereto. This will permit the escape of air from behind the diaphragm 280 and main reservoir pressure will, therefore, force the diaphragm downward, opening the valve 286 and allowing main reservoir pressure to pass to the pipe 170, until pressure in the chamber 233 is equal to or a little more than the adjustment of the spring 215, whereupon the train line will be maintained at that pressure in each and every engine during release.

Having thus described the invention, what I claim as new is:—

1. In an air brake, an engineer's valve, a train line, and means including the engineer's valve for maintaining pressure in the train line to a pre-determined degree when the engineer's valve is in running service position.

2. In an air brake, an engineer's valve, a train line, a main reservoir, a pump governor controlling the feed of air to the main reservoir at release or service positions of the engineer's valve to thereby maintain pressure of air in the main reservoir at a pre-determined degree during release position, and at another pre-determined degree during running service position, and means for automatically feeding air from the main reservoir to the train line during both running service and release positions to maintain the pressure therein at a pre-determined degree during release position and at another pre-determined degree during running service position, said automatic feeding means and engineer's valve together controlling the pump governor.

3. In an air brake, a main reservoir and a train line, an engineer's valve, and means for maintaining pressure in the train line at a pre-determined degree of reduction when the engineer's valve is in running service position by automatically feeding air from the main reservoir to the train line when the pressure in the train line falls below the said pre-determined degree of reduction.

4. In an air brake system, an engineer's valve, a main reservoir, a train line, means actuated when the engineer's valve is at release position for automatically feeding air from the main reservoir to the train line upon a decrease of pressure in the train line less than a pre-determined degree and automatically cutting off air from the main reservoir to the train line when the pressure in the train line rises above said pre-determined degree, and means for automatically feeding air from the main reservoir to the train line upon a decrease of pressure in the train line less than a pre-determined degree, said means operating when the engineer's valve is in running service position.

5. In an air brake system, an engineer's valve, a main reservoir, a pump governor operatively connected to the main reservoir to control the operation of the air pump during release and service positions of the brakes, in combination with means for automatically controlling the feed of air from the main reservoir to the train pipe during release position of the engineer's valve, and means for automatically controlling the feed of air from the main reservoir to the train line during running service position of the engineer's valve, both said latter means and the engineer's valve together controlling the pump governor.

6. In an air brake system, an engineer's valve, a train pipe, a main reservoir, a valve automatically controlling the admission of air to the train pipe from the main reservoir in running service position, means actuated by pressure in the train pipe for controlling said valve, and means for transmitting the pressure from the train pipe to said last-named means either through the engineer's valve or directly from the train pipe.

7. In an air brake system, a train pipe, an engineer's valve, a main reservoir, a feed valve controlling the passage of air from the main reservoir to the engineer's valve and air to the train pipe during release position of the engineer's valve, means controlled by the pressure in the train pipe for controlling said feed valve, a second feed valve controlling the passage of air from the main reservoir to the engineer's valve and to the train pipe in running service position of the engineer's valve, means controlled by train pipe pressure for controlling said second-named feed valve, and means for connecting said second-named controlling means directly with the train pipe and by-passing the engineer's valve.

8. In an air brake locomotive equipment, a main reservoir, an engineer's valve, a train pipe, a feed valve controlling the passage of air from the main reservoir to the train pipe during release position of the engineer's valve, a feed valve automatically controlling the passage of air from the main reservoir to the train pipe in the running service position of the engineer's valve, and means whereby a reduction in train line pressure caused by the operation of the engineer's valve would automatically cut out the feed valves of connected locomotive equipments, and whereby an increase of pressure in the train line through the operation of the engineer's valve would automatically cut in the feed valves of connected locomotive equipments.

9. In an air brake system the combination with a main reservoir and a train line, of means including a manually operable device and an automatically operable device for establishing communication between the reservoir and train line in release and running service positions, the automatically operable device being capable of passing air under higher pressure when the manually operable device is in running service position.

10. In an air brake system, the combination with a main reservoir and a train line, of means including a manually operable device and an automatically operable device for establishing communication between the reservoir and train line in release and running service positions, the automatically operable device being capable of passing air under higher pressure when the manually operable device is in running service position, and means for supplying air to the reservoir, said means permitting the charging of the reservoir at different pressures, depending upon the pessure at which air may pass the automatically operable device.

11. In fluid pressure systems, a train line, a main reservoir, an engineer's valve, and a feed valve between the reservoir and engineer's valve, said feed valve being controlled by train line pressure, whereby when it is in communication with the train line through the engineer's valve, it may maintain a predetermined pressure therein and between it and the engineer's valve and whereby when it is not in such communication with the train line, it may admit a higher pressure between it and the engineer's valve.

12. In a fluid pressure system, a main reservoir, an engineer's valve, a train line, and a pair of feed valves, one feed valve receiving air from the main reservoir and the other feed valve receiving air from the first feed valve, means for bringing the first valve into direct communication with the train line when the engineer's valve is in release position, and means for bringing the first feed valve into indirect communication with the train line through the second feed valve when the engineer's valve is in running service position.

13. In a fluid pressure system, a main reservoir, an engineer's valve, a train line, a pair of feed valves, one feed valve receiving air from the main reservoir and the other feed valve receiving air from the first feed valve, means for bringing the first valve into direct communication with the train line when the engineer's valve is in release position, and means for bringing the first feed valve into indirect communication with the train line through the second feed valve when the engineer's valve is in running service position, the first feed valve, when in direct communication with the train line, supplying air thereto at a predetermined pressure.

14. In a fluid pressure system, a main reservoir, an engineer's valve, a train line. a pair of feed valves, one feed valve receiving air from the main reservoir and the other feed valve receiving air from the first feed valve, means for bringing the first valve into direct communication with the train line when the engineer's valve is in release position, and means for bringing the first feed valve into indirect communication with the train line through the second feed valve when the engineer's valve is in running service position, the first feed valve, when in direct communication with the train line, supplying air thereto at a predetermined pressure and the second feed valve, when in operation, maintaining the pressure in the train line at a point equal to the pressure after reduction of pressure in the train line.

15. A fluid pressure system including a main reservoir, an engineer's valve, a train line, a pump governor, and a pair of feed valves controlling supply of air from the main reservoir to the train line and from the main reservoir to the governor.

16. A fluid pressure system including a main reservoir, an engineer's valve, a train line, a pump governor, and a pair of feed valves controlling supply of air from the main reservoir to the train line and from the main reservoir to the governor, said feed valves co-acting with each other and the engineer's valve, whereby air will be supplied to the governor at one pressure when the first feed valve controls the supply of air to the train line and at another pressure when the second feed valve controls the supply of air to the train line.

17. A fluid pressure system including a main reservoir, an engineer's valve, a train line, a pump governor, and a pair of feed valves controlling supply of air from the main reservoir to the train line and from the main reservoir to the governor, said feed valves co-acting with each other and the engineer's valve, whereby air will be supplied to the governor at one pressure when the first feed valve controls the supply of air to the train line and at another pressure when the second feed valve controls the supply of air to the train line, the air supplied to the train line, in each instance, passing through the first feed valve.

18. A fluid pressure system including a main reservoir, an engineer's valve, a train line, a pump governor, and a pair of feed valves controlling supply of air from the main reservoir to the train line and from the main reservoir to the governor, said feed valves co-acting with each other and the engineer's valve, whereby air will be supplied to the governor at one pressure when the first feed valve controls the supply of air to the train line and at another pressure when the second feed valve controls the supply of air to the train line, the air thus supplied to the governor in each case passing thereto directly from the first feed valve.

19. A fluid pressure system including a main reservoir, an engineer's valve, a train line, a pump governor, and a pair of feed valves controlling supply of air from the main reservoir to the train line and from the main reservoir to the governor, said feed valves co-acting with each other and the engineer's valve, whereby air will be supplied to the governor at one pressure when the first feed valve controls the supply of air to the train line and at another pressure when the second feed valve controls the supply of air to the train line, the air thus supplied to the governor in each case passing thereto directly from the first feed valve and all air supplied to the train line passing through the first feed valve.

20. In an air brake system, a main reservoir, an engineer's valve, a train line, and means for maintaining pressure in the train line during service application of the brakes, said means being rendered ineffective when the engineer's valve is in lap position, whereby complete venting of the main reservoir through accidental venting of the train line is prevented.

21. In an air brake system, a main reservoir, an engineer's valve, a train line, an equalizing reservoir, said engineer's valve, in one position, causing a uniform reduction of pressure in the train line and equalizing reservoir, and means for maintaining pressure in the train line equal to the reduced pressure in the equalizing reservoir when the engineer's valve is in running service position, said means being inoperative when the engineer's valve is in lap position.

22. In an air brake system, a main reservoir, an engineer's valve, a train line, an equalizing reservoir, said engineer's valve, in one position, causing a uniform reduction of pressure in the train line and equalizing reservoir, means for maintaining pressure in the train line equal to the reduced pressure in the equalizing reservoir when the engineer's valve is in running service position, said means being inoperative when the engineer's valve is in lap position, and means for establishing direct communication between the equalizing reservoir and the train line.

23. In an air brake system, a main reservoir, an engineer's valve, a train line, an equalizing reservoir, said engineer's valve, in one position, causing a uniform reduction of pressure in the train line and equalizing reservoir, means for maintaining pressure in the train line equal to the reduced pressure in the equalizing reservoir when the engineer's valve is in running service position, said means being inoperative when the engineer's valve is in lap position, and means for establishing direct communication between the equalizing reservoir and the train line, said latter means being independent of the engineer's valve.

24. A fluid pressure system including a main reservoir, an engineer's valve, a train line, a feed valve controlling supply of air from the main reservoir to the train line in release position of the engineer's valve, and a second feed valve controlling the supply of air from the main reservoir to the train line during running service position of the engineer's valve.

25. A fluid pressure system including a main reservoir, an engineer's valve, a train line, a feed valve controlling supply of air from the main reservoir to the train line in release position of the engineer's valve, and a second feed valve controlling the supply of air from the main reservoir to the train line during running service position of the engineer's valve, the air supply to the train line in the release position of the engineer's valve passing directly from the first feed valve to the engineer's valve.

26. A fluid pressure system including a main reservoir, an engineer's valve, a train line, a feed valve controlling supply of air from the main reservoir to the train line in release position of the engineer's valve, and a second feed valve controlling the supply of air from the main reservoir to the train line during running service position of the engineer's valve, the air supply to the train line in the release position of the engineer's valve passing directly from the first feed valve to the engineer's valve while the air supply to the train line in running service position of the valve passes from the first valve through the second valve and thence to the engineer's valve.

27. In an air brake system, a main reservoir, an engineer's valve, a train line, and means for supplying air from the reservoir to the train line through the engineer's valve in running service position of the engineer's valve.

In testimony whereof I affix my signature in presence of two witnesses.

WILLIS C. WEBSTER. [L. S.]

Witnesses:
J. K. MOORE,
FREDERIC B. WRIGHT.